United States Patent
Larson et al.

(10) Patent No.: US 11,498,007 B2
(45) Date of Patent: Nov. 15, 2022

(54) MEASURING AND DETECTING IDLE PROCESSING PERIODS AND IDENTIFYING ROOT CAUSES THEREOF IN CLOUD-BASED, STREAMING APPLICATIONS

(71) Applicant: NVIDIA Corporation, Santa Clara, CA (US)

(72) Inventors: Alan Daniel Larson, San Jose, CA (US); Bipin Todur, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 145 days.

(21) Appl. No.: 17/124,967

(22) Filed: Dec. 17, 2020

(65) Prior Publication Data

US 2022/0193558 A1 Jun. 23, 2022

(51) Int. Cl.
*G06F 9/455* (2018.01)
*H04L 65/60* (2022.01)
*A63F 13/86* (2014.01)
*A63F 13/35* (2014.01)
*H04L 67/10* (2022.01)

(52) U.S. Cl.
CPC ............. *A63F 13/86* (2014.09); *A63F 13/35* (2014.09); *G06F 9/45558* (2013.01); *H04L 65/60* (2013.01); *G06F 2009/45595* (2013.01); *H04L 67/10* (2013.01)

(58) Field of Classification Search
CPC ....... G06F 9/45558; G06F 2009/45595; A63F 13/35; A63F 13/86; H04L 65/60; H04L 67/10

USPC ........................................................ 709/218
See application file for complete search history.

(56) References Cited

U.S. PATENT DOCUMENTS

| | | | |
|---|---|---|---|
| 2008/0220854 A1* | 9/2008 | Midgley | A63F 13/12 463/25 |
| 2009/0164655 A1* | 6/2009 | Pettersson | H04L 65/65 709/231 |
| 2015/0130813 A1* | 5/2015 | Taraki | G06F 1/3209 345/441 |
| 2015/0134840 A1* | 5/2015 | Thompson | H04L 67/1021 709/228 |
| 2016/0249356 A1* | 8/2016 | Pope | H04L 65/70 |
| 2021/0303367 A1* | 9/2021 | Keller | H04L 41/0895 |

* cited by examiner

*Primary Examiner* — Frantz B Jean
(74) *Attorney, Agent, or Firm* — Leydig, Voit & Mayer, Ltd.

(57) ABSTRACT

A technique for analyzing data in order to detect issues within a cloud-based service is disclosed. Host computing devices in a data center launch virtual machines, where at least some virtual machines run a pipelined stack for a streaming service. Virtual machines in the host computing devices generate event data including timestamps. Metadata generated by the pipelined stack during each streaming session is analyzed to identify deadzones in the corresponding host computing device, and the event data is processed to identify potential root causes of the corresponding deadzones. The event data can be generated by the virtual machine hosting the streaming service or by different virtual machines on the same host computing device. A distribution of events of each event type relative to the identified deadzones is determined and an operation of the host computing device can be adjusted based on the distribution.

20 Claims, 15 Drawing Sheets

MEASURING AND DETECTING IDLE PROCESSING PERIODS AND IDENTIFYING ROOT CAUSES THEREOF IN CLOUD-BASED, STREAMING APPLICATIONS

BACKGROUND

Many service providers allow millions of users to connect client devices to hosted cloud-based services. Examples of cloud-based services include video streaming services and, more recently, game streaming services. Unlike conventional video game applications where the application is executed locally by a console system or computing device, the game application in the cloud-based game streaming service is hosted on server computers and the frames of video content generated by the game application are transmitted to the client device via a network.

Streaming services are typically implemented using a number of virtual machines (VMs) running on one or more hosts in one or more data centers. Each VM can implement one or more stages of a software stack (i.e., a pipeline), where each stage performs some processing on a data stream. For example, in a game streaming service like GeForce Now® (GFN), the pipeline can include stages for capturing a rendering output (i.e., a frame) of a game hosted by a VM, encoding the frame into a bit stream, adding forward error correction to the bit stream, and the like. The bit stream is transmitted to a client device connected to the service over a network.

Each VM is running on a physical machine referred to as a host. Each host can run multiple VMs substantially in parallel, either on multiple cores/processor contexts or in a time division duplex manner. For example, each host refers to a computing device (e.g., a server) that includes 16 CPU cores, 32 GB of random access memory (RAM), and two graphics processing units (GPUs). In one case, the host can run two VMs in parallel, with each VM having access to one GPU and 8 CPU cores, plus approximately 16 GB of memory. In another case, four or more VMs can be executed by the host, with each VM having access to one or more CPU cores and a portion of the GPU resources, which are scheduled according to time slices and/or a priority associated with each VM.

When a host machine is multiplexed in this manner, the physical resources can become very limited. The complexity of managing performance in a heavily virtualized environment comes with inherent performance issues. For example, one VM can generate a large memory access request that ties up the memory resource in the host for a significant amount of time (e.g., 10s or 100s of ms) as page faults can trigger load requests to be sent to a persistent storage medium such as a hard disk drive array or a storage area network (SAN) hosted elsewhere in the data center. In some cases, the hardware resources used by one VM can cause delays in the execution of a different VM of the host as the VM waits for the resources of the host to become available. In the case of a service with real-time requirements, such delays can cause noticeable issues at the client side such as frames failing to arrive at the desired frame rate, and there is a need for addressing these issues and/or other issues associated with the prior art.

SUMMARY

Embodiments of the present disclosure relate to systems and methods for identifying deadzones—defined as the occurrence of a period of time where the software stack is idle and not producing any outputs at any stage of the pipeline—on a host computing device.

In accordance with a first aspect of the present disclosure, a computer-implemented method is disclosed for identifying deadzones on a host computing device and determining a root cause of the deadzones. The method includes the steps of identifying one or more deadzones associated with at least one streaming session in a plurality of streaming sessions, wherein the at least one streaming session corresponds to at least a portion of a software stack executed on a virtual machine of a host computing device; for each deadzone identified for a particular streaming session, identifying events in event data generated by one or more additional virtual machines of the host computing device that occur proximate the deadzone; for each event type of a plurality of event types, determining a distribution of events of the event type relative to the identified deadzones; and adjusting an operation of the host computing device based on the distribution of events for the plurality of event types.

In some embodiments of the first aspect, the software stack includes a plurality of stages of a game streaming service. The stages include at least one of a frame capture stage, an encoding stage, and a transmit stage.

In some embodiments of the first aspect, the host computing device executes a second virtual machine configured to execute a game application. The game application is configured to generate image frames that are processed by the software stack to send a bitstream to a client device that is configured to display the image frames to a user of the game streaming service. The client device is configured to transmit inputs from the client device to the game application to render subsequent frames of the game application.

In some embodiments of the first aspect, identifying events in the event data generated by one or more additional virtual machines of the host computing device that occur proximate the deadzone includes, for each event in the event data, calculating a difference between a timestamp associated with the event and a timestamp associated with each identified deadzone; and flagging, for a particular deadzone, each event having an absolute value of the difference that is less than a threshold value as being correlated with the deadzone.

In some embodiments of the first aspect, determining the distribution of events of the event type relative to the time of the corresponding deadzone includes generating a histogram by counting a number of occurrences of each event type within a number of time segments in a time window surrounding the corresponding deadzone.

In some embodiments of the first aspect, adjusting the operation of the host computing device based on the distribution of events for the plurality of event types includes determining that the distribution of events for a particular event type includes a number of events in a particular time segment that exceeds an average number of events per time segment by a threshold amount; and identifying the operation based on the particular event type.

In some embodiments of the first aspect, adjusting the operation of the host computing device includes migrating a second virtual machine on the host computing device to a second host computing device.

In some embodiments of the first aspect, adjusting the operation of the host computing device includes migrating data corresponding to the event type from a first storage device to a second storage device.

In some embodiments of the first aspect, identifying deadzones associated with the at least one streaming session in the plurality of streaming sessions includes sorting one or more timestamps included in metadata for the at least one streaming session into a series; computing a difference between each timestamp in the series with a previous timestamp; and comparing each difference to a threshold value, wherein any difference greater than the threshold value indicates an identified deadzone.

In accordance with a second aspect of the present disclosure, a system is disclosed that includes at least one host computing device and an analytics engine. Each host computing device is configured to launch at least one virtual machine configured to process content for one or more streaming sessions. The at least one streaming session corresponds to a software stack executed on a virtual machine of a host computing device that is configured to generate content for display by a corresponding client device. The analytics engine is configured to identify deadzones associated with the at least one streaming session in a plurality of streaming sessions; for each deadzone identified for a particular streaming session of a particular host computing device, identify events in event data generated by one or more additional virtual machines of the particular host computing device that occur proximate the deadzone; for each event type of a plurality of event types, determining a distribution of events of the event type relative to the identified deadzones; and adjusting an operation of the at least one host computing device based on the distribution of events for the plurality of event types.

In some embodiments of the second aspect, the software stack comprises a plurality of stages of a game streaming service that includes at least one of a frame capture stage, an encoding stage, and a transmit stage.

In some embodiments of the second aspect, the host computing device executes a second virtual machine configured to execute a game application. The game application is configured to generate image frames that are processed by the software stack to send a bitstream to a client device that is configured to display the image frames to a user of the game streaming service. The client device is configured to transmit inputs from the client device to the game application to render subsequent frames of the game application.

In some embodiments of the second aspect, identifying events in the event data generated by one or more additional virtual machines of the host computing device that occur proximate the deadzone includes, for each event in the event data, calculating a difference between a timestamp associated with the event and a timestamp associated with each identified deadzone; and flagging, for a particular deadzone, each event having an absolute value of the difference that is less than a threshold value as being correlated with the deadzone.

In some embodiments of the second aspect, determining the distribution of events of the event type relative to the time of the corresponding deadzone includes generating a histogram by counting a number of occurrences of each event type within a number of time segments in a time window surrounding the corresponding deadzone.

In some embodiments of the second aspect, adjusting the operation of the host computing device based on the distribution of events for the plurality of event types includes determining that the distribution of events for a particular event type includes a number of events in a particular time segment that exceeds an average number of events per time segment by a threshold amount; and identifying the operation based on the particular event type.

In some embodiments of the second aspect, adjusting the operation of the host computing device includes migrating a second virtual machine on the host computing device to a second host computing device.

In some embodiments of the second aspect, adjusting the operation of the host computing device includes migrating data corresponding to the event type from a first storage device to a second storage device.

In some embodiments of the second aspect, identifying deadzones associated with the at least one streaming session in the plurality of streaming sessions includes sorting one or more timestamps included in metadata for the at least one streaming session into a series; computing a difference between each timestamp in the series with a previous timestamp; and comparing each difference to a threshold value, wherein any difference greater than the threshold value indicates an identified deadzone.

In accordance with a third aspect of the present disclosure, a non-transitory computer-readable medium storing instructions is disclosed. The instructions, when executed by a processor, cause the processor to perform steps including for at least one streaming session in a plurality of streaming sessions, identifying deadzones associated with the streaming session, wherein the at least one streaming session corresponds to a software stack executed on a virtual machine of a host computing device; for each deadzone identified for a particular streaming session, identifying events in event data generated by one or more additional virtual machines of the host computing device that occur proximate the deadzone; for each event type of a plurality of event types, determining a distribution of events of the event type relative to the identified deadzones; and adjusting an operation of the host computing device based on the distribution of events for the plurality of event types.

In some embodiments of the third aspect, the software stack comprises a plurality of stages of a game streaming service that includes at least one of a frame capture stage, an encoding stage, and a transmit stage.

BRIEF DESCRIPTION OF THE DRAWINGS

The present systems and methods for measuring and detecting deadzones on a host computing device are described in detail below with reference to the attached drawing figures, wherein.

DETAILED DESCRIPTION

Systems and methods are disclosed related to measurement and detection of deadzones—when the software stack is idle and not producing any outputs at any stage of the application processing pipeline—experienced by a host computing device. The techniques described herein enable detection of deadzones and identification of root causes for those deadzones such that a cloud-based service or services can be manipulated to improve the user experience. In one particular example, the interaction of multiple virtual machines executing on various host devices can be analyzed to identify particular virtual machines that may interact to negatively affect the quality of a streaming service run on a different virtual machine of the same host device. Once the root cause of the deadzone is discovered, then ameliorating steps can be taken, either manually or automatically, to improve the service, such as by changing priorities of various applications or migrating certain virtual machines to different host devices in the same data center.

Conventionally, the analysis of complex systems such as the resources of a data center to identify potentially intermittent issues related to asynchronous resource contention is a hard problem to solve. Collection of enough data to identify the issues and finding a manner to quantify objective criteria for identifying the root cause of an issue can be difficult. This is especially true when VMs for unrelated applications can be launched on the same hosts at different times. Automated systems for collecting and analyzing this type of data can vastly improve the ability of developers to address potential issues and can easily help change a real-time on-demand service such as game streaming from nearly unusable to enjoyable. The techniques and solutions provided herein are described in more detail below.

Figure 1:
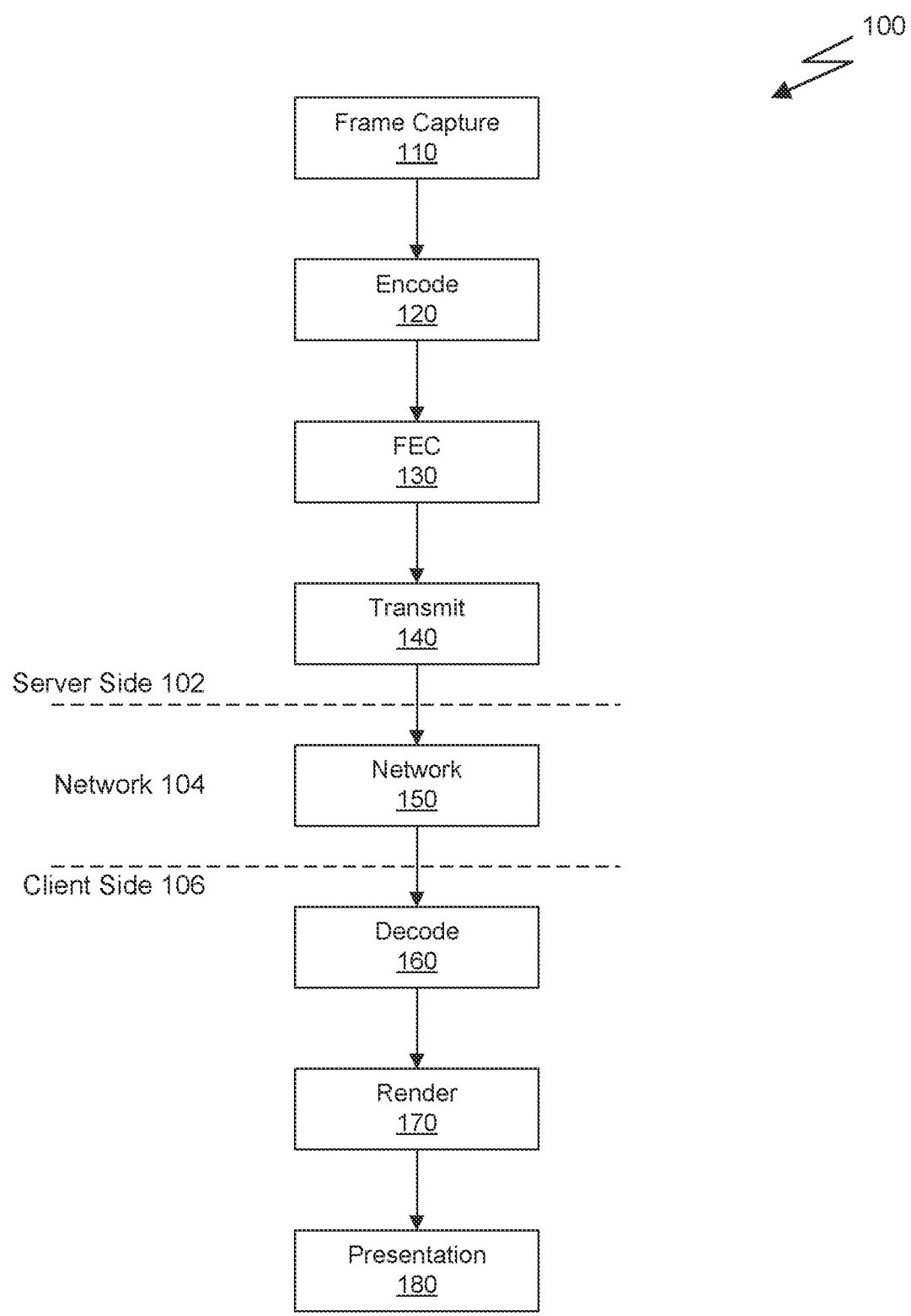
FIG. 1 illustrates a pipelined stack for a cloud-based service, in accordance with some embodiments.

FIG. 1 illustrates a pipelined stack 100 for a cloud-based service, in accordance with some embodiments. The pipelined stack 100 may include a plurality of stages. Each stage includes one or more components, and the output of one stage is received at the input of a subsequent stage. Although the pipelined stack 100 is described for a real-time game streaming service, other embodiments can implement a different type of service (e.g., video streaming, audio streaming, productivity apps, etc.) with a different set of stages in the pipelined stack 100.

As depicted in FIG. 1, a pipelined stack 100 for a game streaming service includes a number of stages. The server side 102 of the pipelined stack 100 implements a number of stages on one or more server devices, and the stages including a frame capture stage 110, an encoding stage 120, a forward error correction (FEC) stage 130, and a transmit stage 140. The pipelined stack 100 also includes a network stage 150 that encompasses the transmission of data packets over a network 104 from the server side 102 to the client side 106. The client side 106 of the pipelined stack 100 implements a number of stages on one or more client devices, the stages including a decoding stage 160, a display stage 170, and a client resynchronization (resync) stage 180.

It will be appreciated that the exemplary pipelined stack 100 for a game streaming service is depicted in FIG. 1 for purposes of illustration of the various techniques described herein. In other embodiments, the particular arrangement of stages in the pipelined stack 100 can be different, such as by including additional stages not shown in FIG. 1 or omitting stages that are shown in FIG. 1. For example, the FEC stage 130 may be omitted where FEC is not implemented by the service. In addition, some implementations may combine aspects of two or more stages into a single stage (e.g., FEC and transmit may be combined into a single stage of the pipelined stack 100).

Each stage shown in FIG. 1 can include one or more components. For example, the encoding stage 120 can include a queue component that asynchronously receives frames from the frame capture stage 110 while a previous frame is being encoded by an encoder component. The encoding stage 120 can also include a send queue component that asynchronously receives encoded frames from the encoder component and transmits the encoded frames to the FEC stage 130 when the encoded frames are available and the FEC stage 130 is ready. As will be discussed in more detail, metadata for the content processed by the stages of the pipelined stack 100 can be updated by each stage or, alternatively, by each component within the stage.

In an embodiment, the content includes one or more frames and metadata is generated for each frame. Each component or stage updates the metadata by adding a time stamp to the metadata for a frame when that stage/component has finished processing the frame. The metadata is then forwarded to the next component/stage along with the processed content.

At the end of the pipelined stack 100, the client device transmits the metadata back to a server device for storage and/or analysis. The metadata for a frame comprises a plurality of time stamps, each time stamp corresponding to the completion of processing for the frame by a particular stage or component of a stage. In some embodiments, the client device is configured to collect metadata for a plurality of frames (e.g., 60 seconds of video at 30-60 frames per second) in a data structure (e.g., a file) before transmitting the data structure to the server device. In such embodiments, the server device collects files for a number of sessions, each session amounting to, e.g., a number of seconds of video. It will be appreciated that the size of a session can be adjusted to match a desired size of the collected metadata, such as by collecting 30 minutes to 60 minutes worth of metadata in a session. In some embodiments, the client device collects the metadata in a circular buffer such that the metadata collected for the session is only the metadata for the last n frames in the session. For example, a circular buffer having a size suitable for collecting 10 minutes of data at 60 frames per second (e.g., 36,000 frames worth of metadata) can continuously collect metadata during a session, overwriting the oldest metadata as the session extends past 10 minutes in length. At the end of the session (e.g., when a game application is terminated), the client device can encode and transmit the contents of the circular buffer to the server device. It will be appreciated that, when a user experiences issues that degrade the user experience, the session will likely be terminated early and, as such, the last m minutes of a session (corresponding to n frames) are usually sufficient to highlight the cause of the issue that degraded the user experience.

In one particular use case, a particular host may run a game on a first VM and a software stack for streaming the frames generated by the game on a second VM. The software stack for the streaming service may not require many compute resources, but can require consistent access to a small number of compute cycles every, e.g., 16.6 ms to maintain a frame rate of 60 Hz at the client side device. If the game running on the first VM creates an issue with the host, typically due to requiring a heavy workload on one or more resources of the host, the software stack for streaming can experience delays caused by a lack of available resources.

It will be appreciated that a deadzone is different from a delay introduced in a particular pipeline stage that stalls subsequent stages of the pipeline. Some inherent latency due to a variable workload is inherently hidden in the architecture of the pipeline and to be expected. Thus, if the encoding stage of the pipeline takes longer than average (e.g., 24 ms) to encode an image frame into the bitstream, other stages of the pipeline can continue to process the bitstream for earlier frames, which may allow some of the delay to be hidden as subsequent stages make up for some or all of the lost time. A deadzone, on the other hand, is indicative of a different issue where all of the stages of the pipeline, or at least multiple stages running on a VM of a particular host, are stalled at once due to a lack of available resources in the host.

Figure 7A:
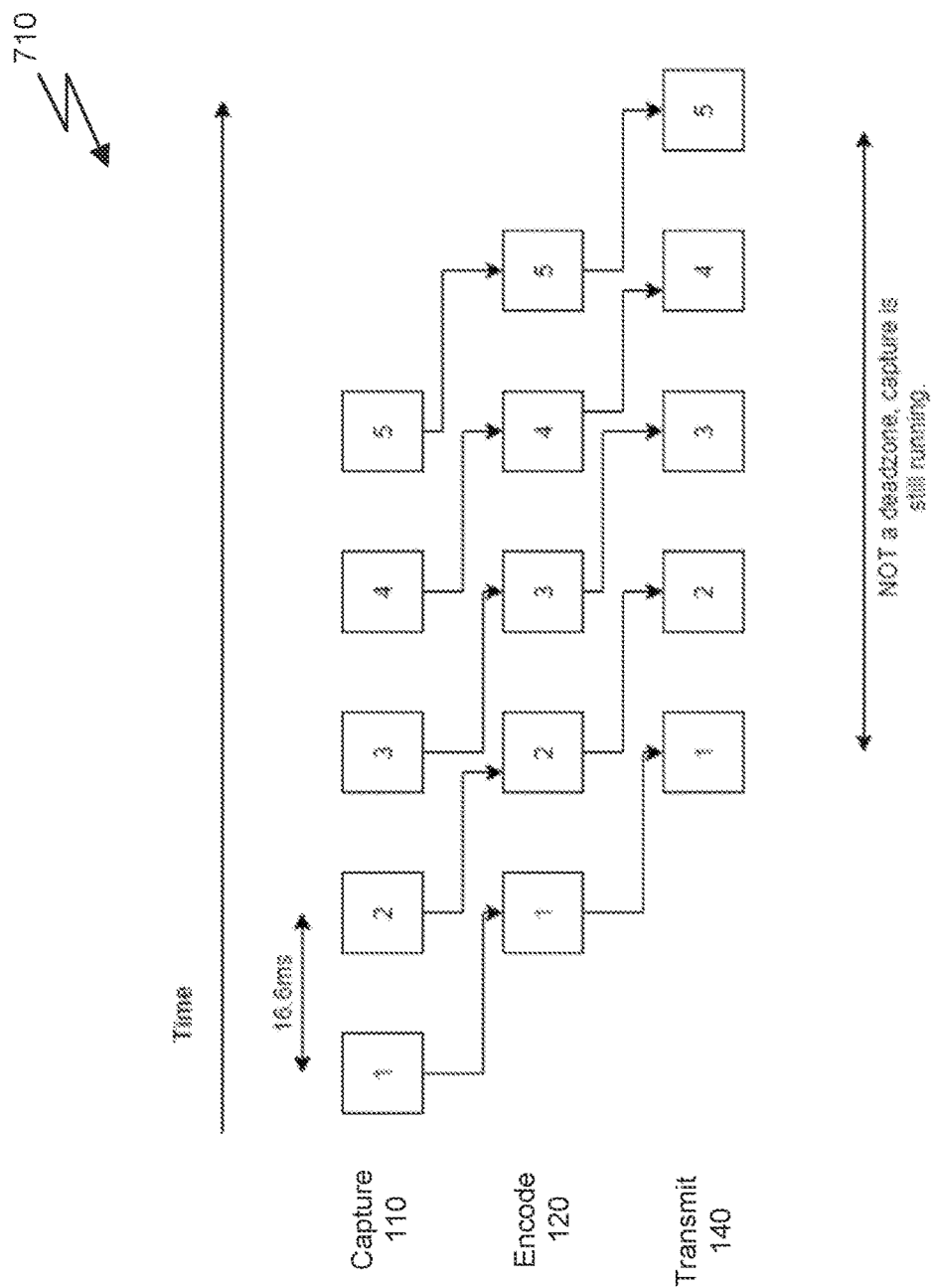
FIGS. 7A-7D illustrate a difference between residual latency and a deadzone on a host device in accordance with some embodiments
Figure 7B:
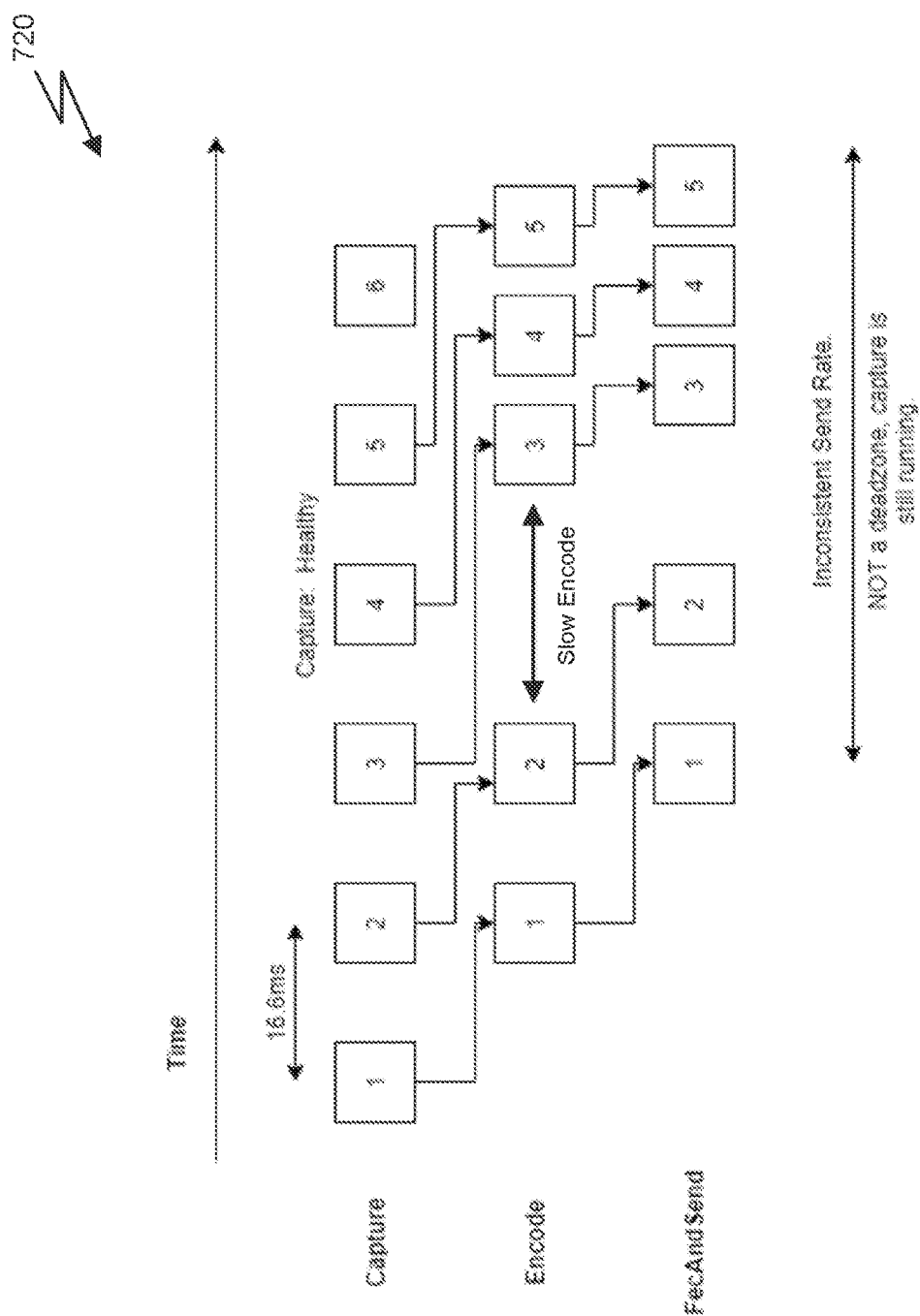
Figure 7C:
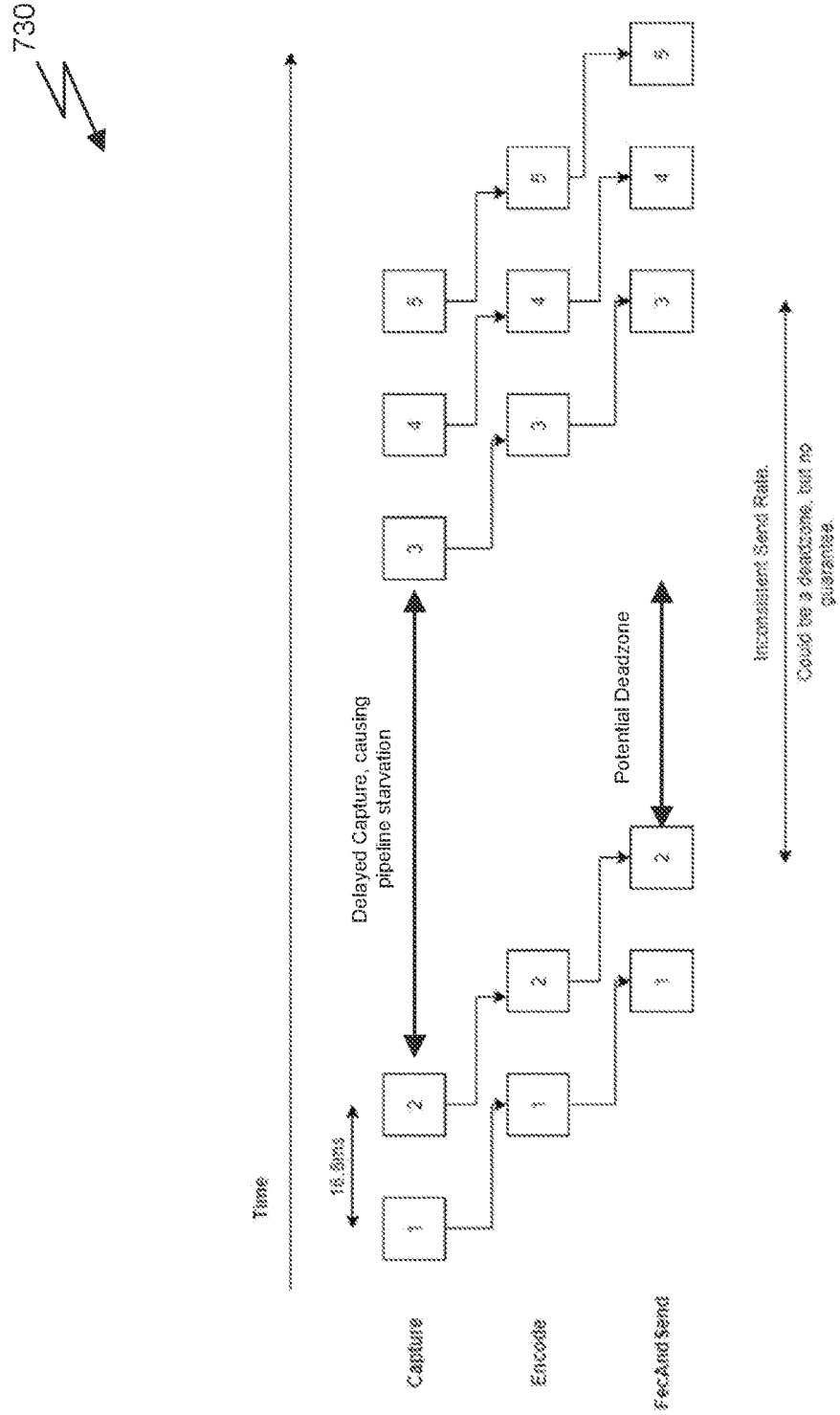

FIGS. 7A-7C illustrate a difference between residual latency and a deadzone on a host device in accordance with some embodiments. As depicted in FIG. 7A, a timing diagram 710 of a number of frames processed by three stages on the server side 102 of the pipelined stack 100 is shown. The server side 102 includes the frame capture stage 110, the encode stage 120, and the transmit Stage 140, where the FEC stage 130 has been omitted (i.e., not implemented). Each block in the timing diagram 710 represents the completion of the processing of a particular frame by that stage. It is apparent that the timing diagram 710 does not show a deadzone in this particular host as all three stages are consistently finished processing a corresponding frame approximately every 16.6 ms, corresponding to a 60 Hz refresh rate.

As depicted in FIG. 7B, a timing diagram 720 of a number of frames processed by the three stages on the server side 102 of the pipelined stack 100 is shown. In this case, the encode stage 120 experiences some latency between frames two and three. In turn, this causes the transmit stage 140 to stall while waiting for the third frame from the encode stage 120. However, this does not represent a deadzone because the frame capture stage 110 is still processing the fourth frame during the latency of the encode stage 120. As long as some stages are still executing on the host device, then the latency could be caused by some other issue unrelated to resource availability of the host.

As depicted in FIG. 7C, a timing diagram 730 of a number of frames processed by the three stages on the server side 102 of the pipelined stack 100 is shown. In this case, the frame capture stage 110 appears to stall after the second frame, thereby starving the pipeline. In turn, the encode 120 and the transmit stage 140 stall after finishing the processing of the second frame. However, there is a significant gap between the end of processing the second frame by the transmit stage 140 and the finishing of processing the third frame by the frame capture stage 110. This delay could be caused by a potential deadzone, although the delay could also simply be caused by an issue experienced by the game application that delayed the production of the third frame. Thus, there is no guarantee that this delay is related to a deadzone.

Figure 7D:
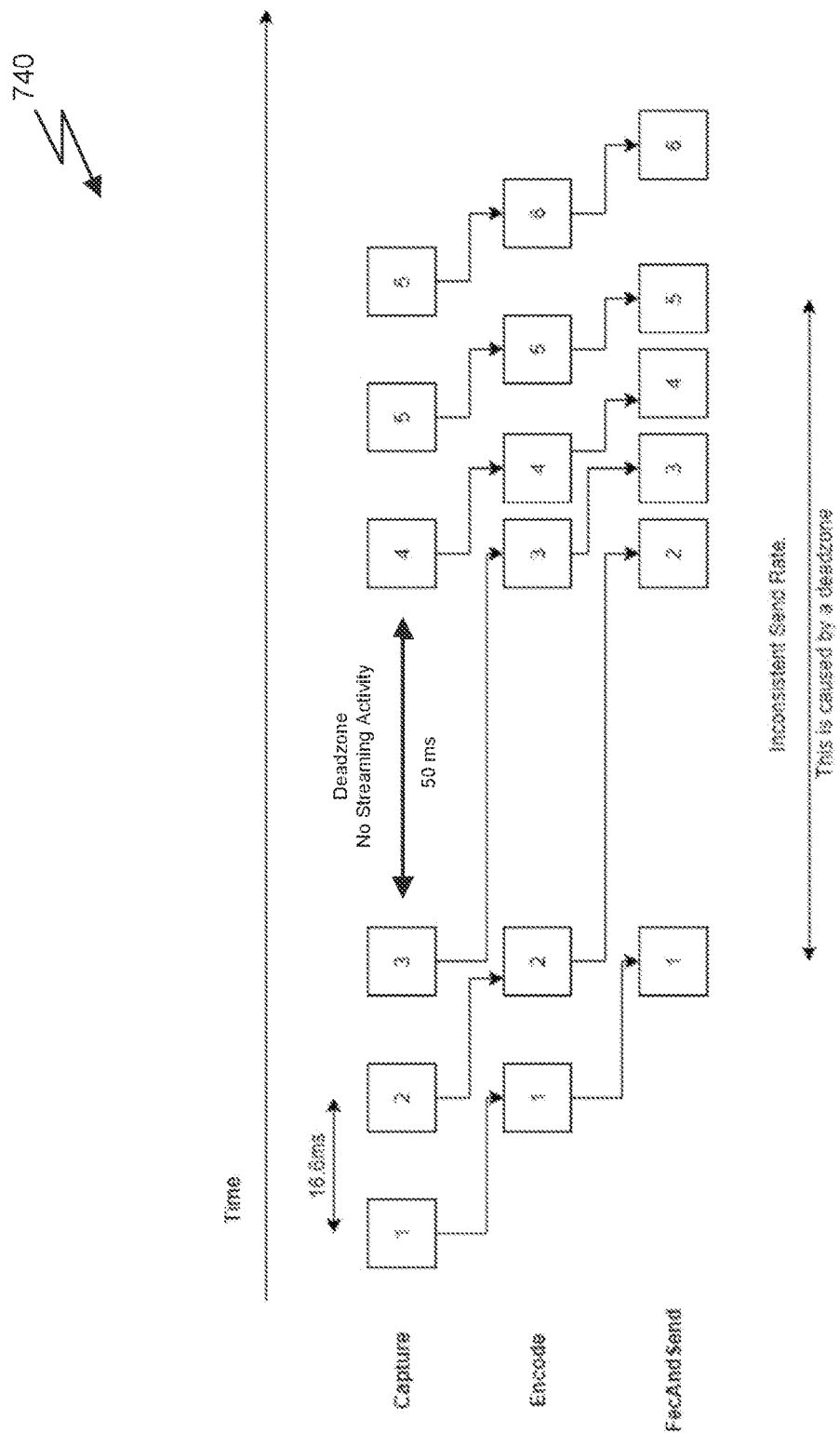

As depicted in FIG. 7D, a timing diagram 740 of a number of frames processed by the three stages on the server side 102 of the pipelined stack 100 is shown. In this case, there is no activity by any of the three stages of the pipelined stack 100 for a period of approximately 50 ms. The processing of the third frame is finished by the frame capture stage 110 at the start of the 50 ms latency period, but the encode stage 120 does not finish processing the third frame until after a significant delay. Similarly, the processing of the second frame is finished by the encode stage 120 at the start of the 50 ms latency period, but the transmit stage 140 does not finish processing the second frame until after a significant delay. Given that the stages of the pipelined stack 100 are all delayed at the same time, and the delay is apparently not caused by the stages being starved of input, this represents a deadzone that is likely caused by some issue with the host device.

Returning now to FIG. 1, a naïve approach to measuring deadzones could use a standalone thread (e.g., running inside the VM for the pipelined stack 100 or running in a separate VM on the host computing device) that generates a timestamp periodically (e.g., every millisecond). In the case that the thread is inside the VM for the pipelined stack 100, the timestamps would be delayed when the host computing device failed to execute the thread on time. Measuring large deltas between timestamps generated in this manner would yield information about deadzones. However, this approach would only capture cases where the VM was not scheduled by the hypervisor, but would not capture instances where the VM was running but in a deadlocked condition waiting for certain resources (e.g., memory resources, network resources, etc.) to respond. In the case that the thread is on a different VM, then the timestamps would merely measure when that particular VM was not scheduled by the hypervisor, even if the VM for the pipelined stack 100 was running perfectly fine. Thus, this approach for generating timestamps to identify deadzones is not ideal.

Instead, in preferred embodiments, it will be appreciated that the deadzones associated with this streaming session can be identified by calculating a residual metric for each frame at each of the plurality of stages of the server side 102 of the pipelined stack 100. A residual metric for a given stage of the pipeline can be calculated as follows:

$$\text{Residual}[i] = (\text{Timestamp}[i] - \text{Timestamp}[i-1]) - \frac{1000}{TargetFPS} \quad \text{(Eq. 1)}$$

Equation 1 measures the difference between the time between the processing of two frames (e.g., frame (i) and frame (i−1)) compared to an expected time between frames based on the target frame rate (TargetFPS) in frames per second. The residual metric is measured in units of milliseconds.

In an embodiment, large residuals for a streaming session can be identified by comparing each residual for each frame to a threshold value. It will be appreciated that the residual for a frame can be calculated for different timestamps throughout the pipelined stack 100. For example, three stages of the pipelined stack 100, a frame capture stage 110, an encode stage 120, and a transmit stage 140, can generate upwards of 20 timestamps during the processing of a single frame, with each stage generating at least one timestamp. Thus, each frame can be associated with 20 different residual values for each of the 20 timestamps generated for that frame compared to a previous frame. In an embodiment, deadzones can be identified by comparing the residual metrics above the threshold value for each of a plurality of stages of the pipelined stack 100 to look for overlap between the large residuals for different frames being processed by the pipeline at the same time. A more detailed explanation of the technique for identifying deadzones is discussed below.

Figure 2A:
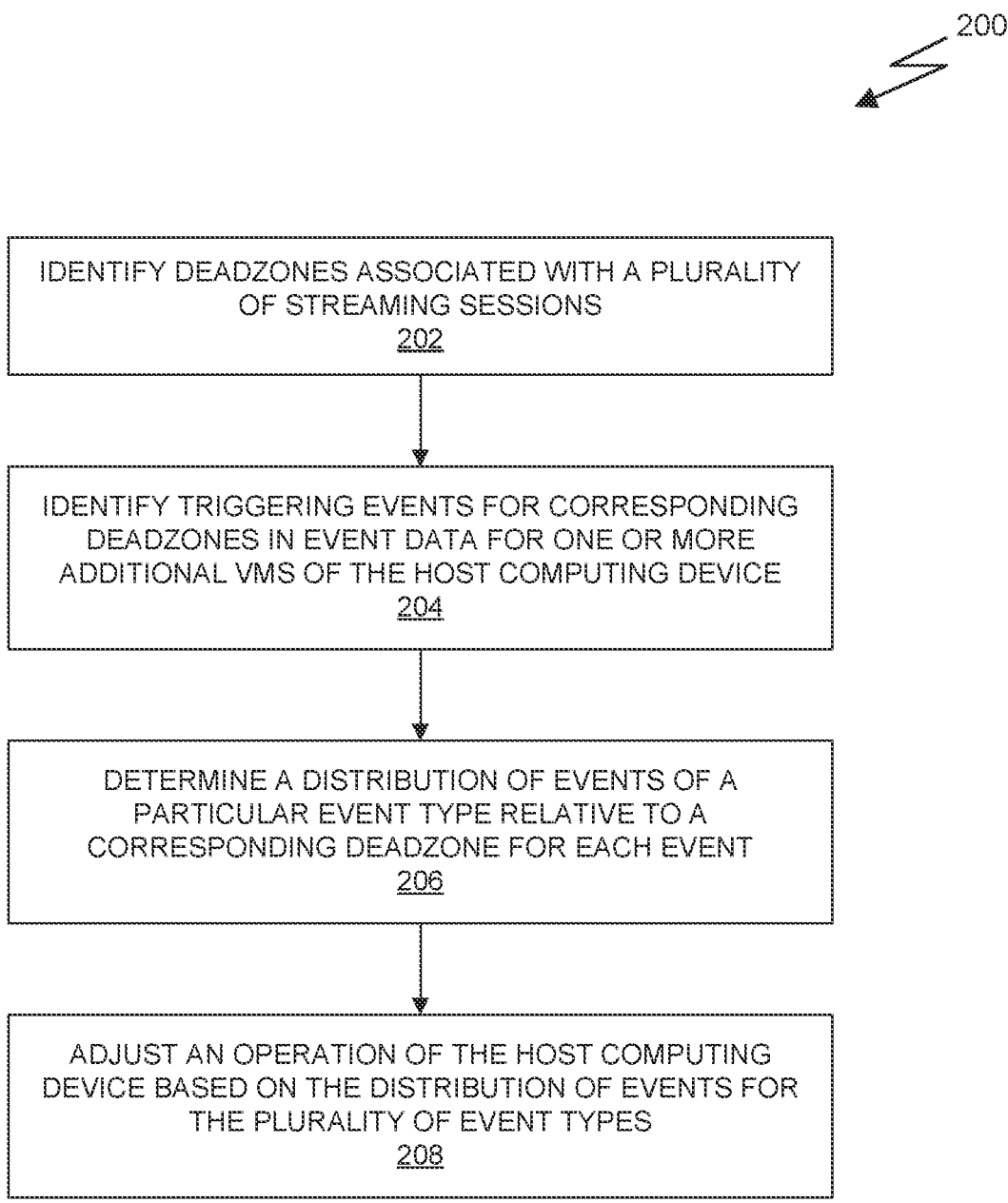
FIG. 2A illustrates a flowchart of a method for identifying events associated with occurrence of a deadzone in a host computing device, in accordance with some embodiments.

FIG. 2A illustrates a flowchart of a method 200 for identifying events associated with occurrence of a deadzone in a host computing device, in accordance with some embodiments. The method 200 of FIG. 2 can be implemented by hardware, software, or some combination thereof. In an embodiment, the method 200 is implemented by a server device that includes at least one of a central processing unit, a parallel processing unit, or any other type of processor capable of executing instructions that cause the server device to perform the operations described below.

At step 202, for each streaming session in a plurality of streaming sessions, deadzones associated with the streaming session are identified. In an embodiment, a streaming session is performed, at least in part, by a pipelined stack executed on a virtual machine of a host computing device. The pipelined stack generates metadata that includes timestamps associated with each stage of the pipelined stack during the streaming session. It will be appreciated that, although a streaming session is sending frames to the client device at a rate of approximately one frame every 16.6 ms, there can be multiple timestamps corresponding to different stages and different frames within a given 16.6 ms time slice of the metadata. For example, in a simplified version of the pipelined stack 100 that includes a frame capture stage 110, an encoding stage 120, and a transmit stage 140, three or more frames can be processed simultaneously by the different stages and one or more timestamps can be generated by each stage during the processing of a single frame. Thus, even if the transmit stage 140 is delayed for any reason, the frame capture 110 and encode stage 120 may be generating time stamps during a given 16.6 ms period corresponding to the same frame or different frames being processed by the transmit stage 140.

In an embodiment, the timestamps collected in the metadata for a streaming session are each tagged with an identifier (i.e., a frame number) for the frame corresponding to that timestamp. The timestamps for all frames in the streaming session are then concatenated into a series that is sorted according to the value of the time stamp such that each timestamp represents a different event that was completed by the pipelined stack 100 over a period of time, but timestamps for different frames may be interleaved in the series as multiple frames are processed by different stages of the pipeline simultaneously. For each timestamp in the series, a difference between the current timestamp and a previous timestamp in the series is calculated. This difference represents a delay associated with the frame for the current timestamp. It will be appreciated that the difference is not a measure of time between processing of the frame by a previous stage in the pipelined stack 100 and the processing of the frame by a subsequent stage in the pipelined stack 100, but is merely a measure of time between processing any frame by any stage of the pipelined stack 100 and the processing of the frame by a particular stage in the pipelined stack 100 represented by the current timestamp. Thus, even if the processing of a particular frame by, e.g., the transmit stage 140 is delayed, the difference can still be small if the frame capture 110 or encode stage 120 of the pipelined stack 100 are actively processing later frames output by the game application.

In an embodiment, identifying a deadzone comprises sorting the differences associated with each unique frame in the sequence of frames in the streaming session and, for each frame, determining whether the largest difference is greater than a threshold value. In the case of a desired 16.6 ms frame rate, the threshold value can be, e.g., 33.3 ms. Any frame with a difference greater than the threshold value can then be flagged as experiencing a deadzone in the host.

At step 204, for each deadzone identified for a particular streaming session, events in event data generated by one or more additional virtual machines of the host computing device are identified that occur proximate the deadzone. In an embodiment, event data for a plurality of VMs executing on the host computing device is collected. Although the event data can be related to VMs for other streaming sessions, the event data is not limited to only additional streaming sessions. For example, event data can be related to VMs running a game application or a completely separate process, such as a networking application, separate cloud-based service, or the like. Any VM that can generate event data for one or more event types and including timestamps that indicate when the event occurred is within the scope of the present disclosure.

Again, each host computing device can implement a number of different VMs, each VM can be running a different streaming session to a different client device, and multiple hosts can be running different VMs for different streaming sessions. In addition, other VMs can be running on the host simultaneously to execute, e.g., game applications or other tools or applications such as tools for managing the network. Each streaming session can be configured to record timestamps for different events such as, but not limited to, a VM starting event, a client connected event, a shader cache loading event, a game launching event, and a session ending event, or the like. The event data reflects the timestamps for each of these events occurring in a particular streaming session. It will be appreciated that an event in a particular streaming session X is not correlated to the same event in a different streaming session Y as the two clients can connect to the streaming service at different times and the execution of the same game can diverge based on, among other things, user input that is highly variable. Thus, an event like a game launching event in session X might be close in time to a different event like a session ending event in session Y.

In an embodiment, for each deadzone identified for a particular streaming session, events in the event data are filtered to include those events that were located on the particular host (i.e., events that occurred within a different VM but on the same host as the particular streaming session) and that occurred within a window of time proximate the deadzone. It will be appreciated that events on other hosts likely do not affect the lack of computing resources within the particular host, and so those events are filtered out. One exception is that network traffic generated by other hosts could be causing an issue with network resources on the particular host that could be, e.g., causing a delay in the pipelined stack due to data packets not being received by the client. Another exception could be if two or more hosts are attempting to load data from a network storage resource external to each host. However, correlating all events on all hosts with a deadzone on a particular host is a harder problem to solve as the fluctuation of network traffic, for example, is likely to be highly random and, therefore, less likely to be identified by studying the distribution of event types in relation to occurrence of a deadzone on a particular host.

Of the filtered events, those events that occurred within a particular time (e.g., up to M seconds before or N seconds after) of the deadzone are flagged as triggering events (i.e., events that may have led to an issue that caused the deadzone). In one embodiment, identifying events in event data generated by one or more additional virtual machines of the host computing device that occur proximate the deadzone comprises: for each event in the filtered event data (e.g., events associated with the particular host computing device and occurring within a particular time), calculating a difference between a timestamp associated with the event and a timestamp associated with each identified deadzone; and flagging, for a particular deadzone, each event having an absolute value of the difference that is less than a threshold value as being correlated with the deadzone.

At step 206, for each event type of a plurality of event types, a distribution of events of the event type relative to the identified deadzones is determined. In an embodiment, a distribution of the location of the triggering events for a particular event type relative to the corresponding deadzones can be plotted to identify events that could be causing the deadzone in the host. The location of the event can refer to a time of the event relative to a time of the deadzone, as identified based on the timestamp for the deadzone and the timestamp for the event. For example, if a triggering event occurred 3 seconds before a deadzone, then the location of the triggering event is defined as −3 seconds. Alternatively, if a triggering event occurred 5 seconds after a deadzone, then the location of the triggering event is defined as +5 seconds.

It will be appreciated that, if an event in a different VM is causing a deadzone in the host for other streaming sessions, then the distribution of events corresponding to that event type, relative to recorded deadzones in one or more streaming sessions that were detected in the same host, will show a concentration of the events at a certain time relative to the deadzone occurring on the host. However, if the event is unrelated to the cause of the deadzone, then the distribution of the events of that event type will be random or roughly uniform relative to the occurrence of the deadzone in the host. For example, if a game being launched for a streaming session is causing a memory to load a large amount of data for the game L seconds after the launch of the game, then it is very likely that the distribution of the game launch event occurring in other streaming sessions will occur L seconds prior to a deadzone in a different streaming session running on the same host.

It will be appreciated that the triggering event can occur before or after the deadzone as the timestamp generated for the event could be generated before the root cause of the deadzone or after the root cause of the deadzone. For example, if a game launch event is generated by a game application after the data for a game is loaded into a memory of the host, then the timestamp for the event might occur after the deadzone because the deadzone is related to a lack of memory resources on the host while data is loaded from a remote storage location into the host RAM. Alternatively, if the deadzone is caused during execution of the game application sometime after the game is launched, then the deadzone may occur after the game launch event. The distribution gives some clue as to whether the occurrence of the deadzone is being caused by something in a different VM that happens at a relatively stable time before or after a given event.

In an embodiment, the distribution can be determined by creating a histogram for each event type. Anytime a triggering event is identified for a particular deadzone, a location of the event relative to the deadzone is determined and a time segment (e.g., bucket, slice, etc.) of the histogram is incremented to show that an event of that event type occurred in that particular time segment relative to a detected deadzone. It will be appreciated that the distribution, and the histogram, can be related to multiple different hosts and any number of deadzones occurring at different times, and is not only a measure of the occurrence of events on the same host for a single deadzone. There would not be nearly enough events happening close to a single deadzone on a single host to make the data relevant to identifying a root cause of that deadzone and, therefore, the events are tracked across multiple hosts and deadzones identified in a large number of different streaming sessions in order to find enough data points to get an accurate representation of the distribution of the events of a particular event type.

Figure 3:
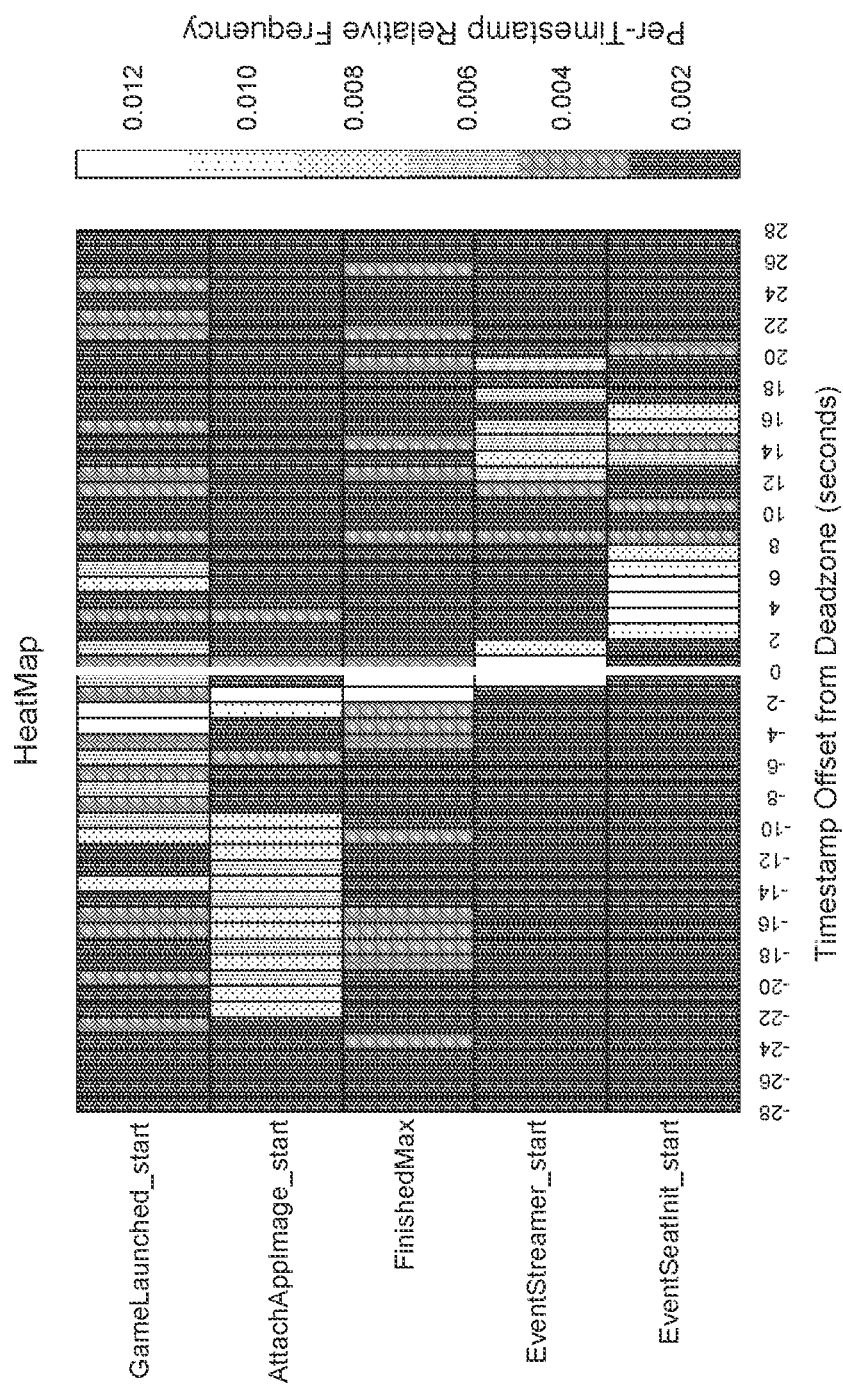
FIG. 3 illustrates a visualization of a heatmap used to determine a distribution of events relative to corresponding deadzones, in accordance with some embodiments.

In an embodiment, the histogram is generated using time segments of approximately one second width for a time window surrounding the deadzone of at least 30 seconds before and 30 seconds after the deadzone. In other words, the histogram includes at least 60 time segments or buckets. In other embodiments, the size of the time window can be increased or decreased and the width of each time segment can also be increased or decreased. For example, a histogram can be created that has time segments of 100 ms width and a time window of 10 seconds before and after the deadzone. The histogram can be included in a heat map as the value of each time segment is directly related to the number of events that occurred at that location relative to a corresponding deadzone. If the event type is not correlated with the occurrence of a deadzone, then the location of the events should be random and approximately evenly distributed across the set of time segments of the histogram (e.g., uniform distribution). However, if the event type is correlated with the occurrence of a deadzone, then the location of events should be highly concentrated in a small subset of time segments of the histogram. FIG. 3, described in more detail below, illustrates a visualization of a heatmap that includes a number of histograms for a plurality of event types.

At step 208, an operation of the host computing device is adjusted based on the distribution of events for the plurality of event types. In an embodiment, the host computing device is adjusted responsive to determining that the distribution of events for a particular event type includes a number of events in a particular time segment that exceeds an average number of events per time segment by a threshold amount, where the time segments refers to the histogram. In an embodiment, the operation being adjusted is identified based on the particular event type. For example, a mapping table can correlate particular event types with a type of operation to perform as well as different operations based on the shape of the distribution (e.g., where a spike in the histogram occurs relative to the corresponding deadzone).

In an embodiment, the host computing device can be adjusted by migrating a virtual machine from one host to a different host. For example, if a particular VM is determined to be the root cause of the deadzone in a host device, then that VM and the application being run therein, can be moved to a different host such that the streaming service on one host is not affected by the application running in a VM in a different host. In some embodiments, the VM running a game application can be moved to a separate host from the VM running the streaming service of at least a portion of the pipelined stack 100. It will be appreciated that, in some cases, moving a VM from one host to another host may not be practical, such as when transferring the data for the image frame from one host to a different host would cause too much latency between the frame being rendered and the frame being displayed on the client device.

In other embodiments, the host computing device can be adjusted by changing operating parameters of a particular VM. For example, a game application can be re-configured to use different settings (e.g., resolution, frame rate, aliasing settings, etc.). In other embodiments, storage resources can be adjusted, such as by moving some data (e.g., high priority data) from a slower storage medium (e.g., SAN, HDD) to a faster storage medium (e.g., SSD) connected to the host. For example, if a game launch event is causing the occurrence of a deadzone, then changing a priority of data for that particular game to be moved from a first storage location on a HDD to a second storage location on a SSD may reduce or mitigate the frequency of deadzones in the host. When different game applications can be run in different VMs of the same host, adjusting a priority of the game applications can affect a storage location of the game application.

It will be appreciated that certain operations of the host can be automatically adjusted in response to analysis of the distribution related to different event types. However, other situations may not be easily adjusted, and in some cases, the server device can send a notification (i.e., a report) to a network manager. The notification can, in some embodiments, include the heatmaps generated by the server, which can be analyzed manually and used by designers to adjust the code of certain applications. By changing the design of certain applications, the applications may utilize certain resources of the host computing device more efficiently, thereby leading to less frequent occurrence of deadzones in the host.

Figure 2B:
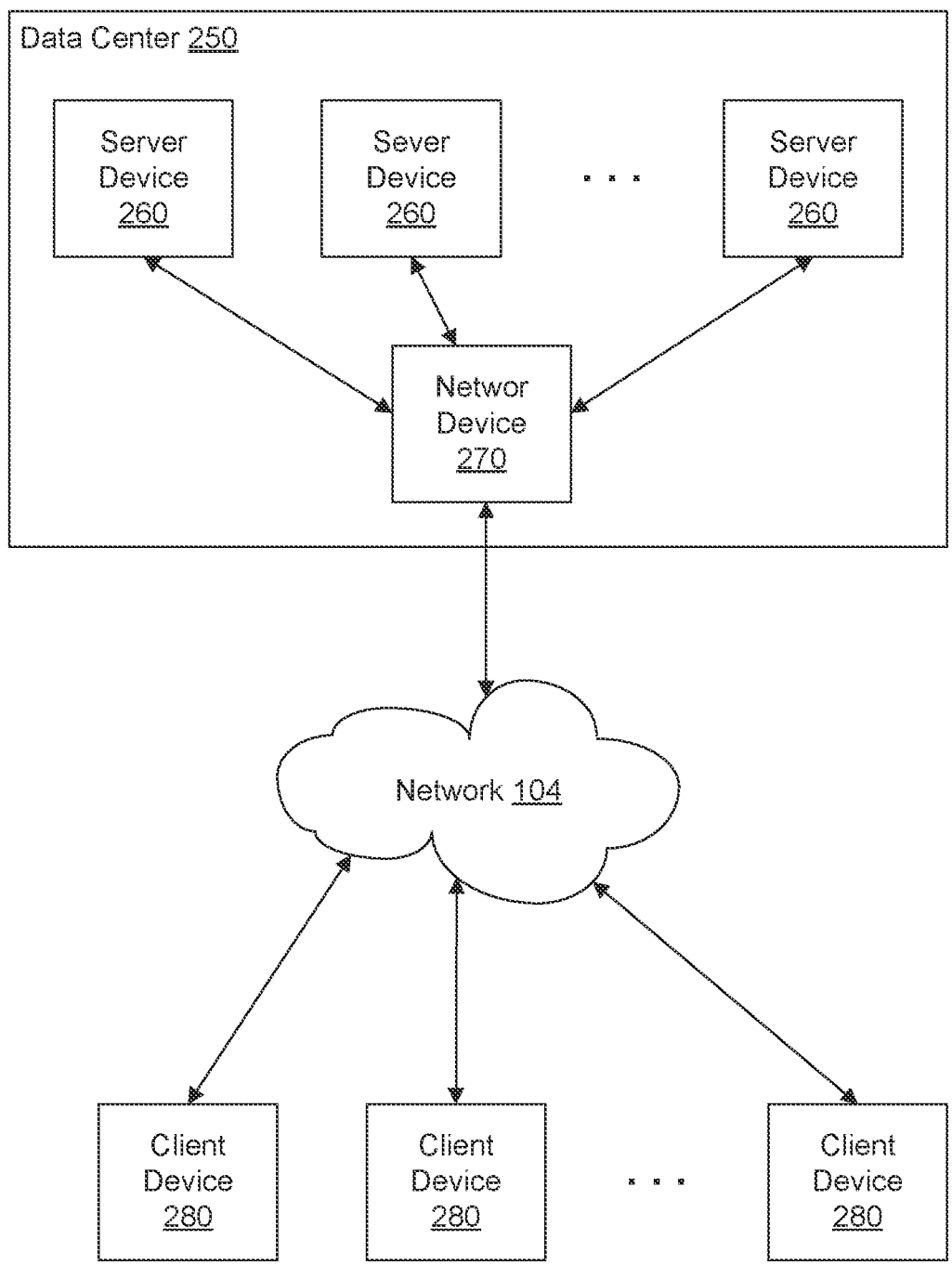
FIG. 2B illustrates a system for implementing the method of FIG. 2A, in accordance with some embodiments.

FIG. 2B illustrates a system for implementing the method 200 of FIG. 2A, in accordance with some embodiments. The system includes a number of server devices 260 located in a data center 250. The server devices 260 are connected to one or more network devices 270 such as a network switch, router, or the like. The network device(s) 270 enable the server devices 260 to communicate within the data center as well as enable the server devices 260 to transmit data packets to a number of client devices 280 via a network 104.

In some embodiments, each of the plurality of server devices 260 is a host running one or more VMs. A particular server device 160 can run a streaming service in a first VM and a game application in a second VM. The game application can generate frames for display on a corresponding client device 280, and the streaming service can encode the frames into a bitstream that is transmitted to the client device 280 via the network 104. The game application can receive input from the client device 280, which is used to render subsequent frames for display.

In other embodiments, a streaming service can be executed in a VM on a first server device 260 and a game application can be executed in a VM on a second server device 260. Frames rendered by the game application are transferred from the second server device 260 to the first server device 260 such that the streaming service can encode and transmit the bitstream for the frames to the client device 280.

Figure 2C:
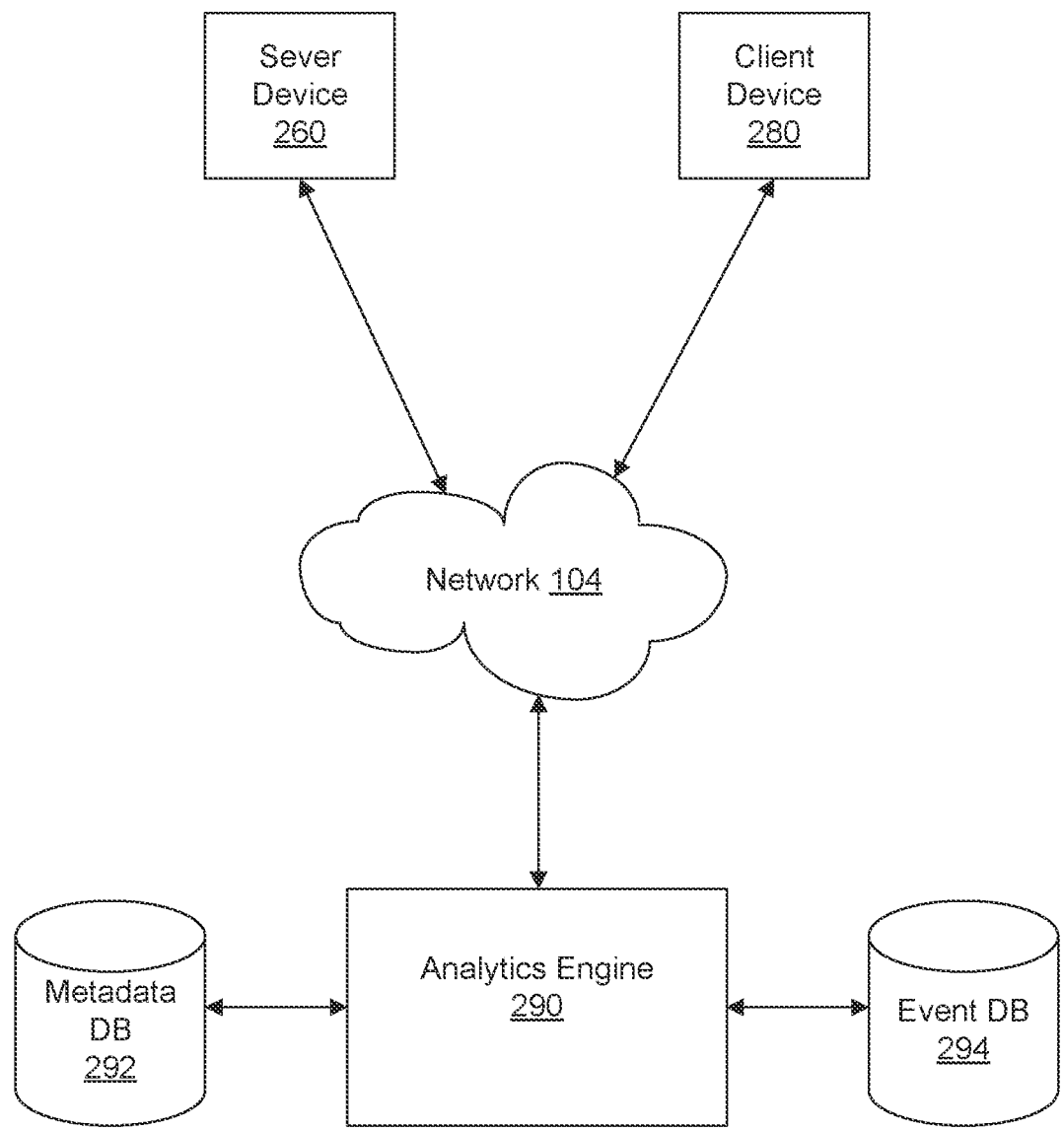
FIG. 2C illustrates a system for detecting deadzones and identifying a root cause, in accordance with some embodiments.

FIG. 2C illustrates a system for detecting deadzones and identifying a root cause, in accordance with some embodiments. The system includes an analytics engine 290. In an embodiment, the analytics engine 290 is a set of instructions configured to be executed by a server device. The analytics engine 290 can be hosted on a virtual machine in the same host computing device as the pipelined stack 100 of the cloud-based service or, alternatively, can be hosted in a different host computing device or even a client device.

In an embodiment, the server devices 260 and/or client devices 280 transmit metadata generated by the pipelined stack 100 to the analytics engine 290. The metadata can be stored in a database 292. In some embodiments, the analytics engine 290 processes the metadata after receiving the metadata for a particular streaming session in order to identify the deadzones, if any, within that streaming session. Instead of storing the metadata for the entire session, the analytics engine 290 only stores the information for identifying the deadzones. For example, for each deadzone identified, the analytics engine can store an identifier for the streaming session, a timestamp indicating a start of the deadzone, and a duration or length of the deadzone. The analytics engine 290 may also store any other pertinent information relating to the deadzone such as a frame identifier for the frame that was last processed by the pipelined stack 100 prior to the start of the deadzone as well as an identifier of the stage of the pipelined stack 100 that processed that frame.

It will be appreciated that the metadata for the streaming session can be transmitted to the analytics engine 290 from the server device 260, including metadata received by the server device 260 from the client device 280, or directly from the client device 280 without being routed to the server device 260.

The analytics engine 290 also receives event data from a plurality of server devices 260, which is stored in a database 294. In an embodiment, the analytics engine 290 implements an application programming interface (API) that allows any process executed in a server device 260 generate event data and transmit the event data to the analytics engine 290 for storage and/or processing. Consequently, any application that builds the functionality for generating event data into the software for the application will generate event data stored in the database 294.

In an embodiment, the event data includes at least one of a timestamp for the event, an identifier that indicates the event type, an identifier of the virtual machine, an identifier for the host computing device, an identifier for the data center, and/or any other useful information associated with the event.

Once the analytics engine 290 has the relevant metadata and event data, the analytics engine 290 is configured to process the data to perform the method 200 set forth above. In some embodiments, the analytics engine 290 is enabled to make changes to the server device 260, the parameters of the pipelined stack 100, and/or any other application hosted in a virtual machine of the host computing device(s).

FIG. 3 illustrates a visualization of a heatmap 300 used to determine a distribution of events relative to corresponding deadzones, in accordance with some embodiments. The heatmap 300 refers to a data structure that includes data for a histogram for one or more event types. As shown in FIG. 3, the heatmap 300 encodes data for a plurality of histograms for a Game Launch event, an Attach Application Image event, a Finished Max event, an Event Streamer event, and an Event Seat Initiation event. These event types correspond to specific events that are generated in one or more different VMs running on the various hosts. It will be appreciated that any number of events can be defined by the developers of various software and the event type examples disclosed in FIG. 3 are merely for illustrative purposes.

In an embodiment, each histogram includes a number of buckets corresponding to a time period relative to a deadzone. Each bucket is colored in accordance with a relative frequency of occurrence of an event in that time period relative to the corresponding deadzone. In an embodiment, each bucket corresponds to a time period of one second, and there are 30 buckets before and 30 buckets after the time of the deadzone, which is represented by a white line in the middle of the histogram. The horizontal axis represents the timestamp offset (in seconds) that is a difference between the event timestamp and the corresponding deadzone timestamp. The color scale as related to corresponding relative frequencies is shown on the right side of the visualization of the heatmap 300, and the various histograms for different event types are stacked in the vertical dimension. In other embodiments, each bucket can represent a different period of time (e.g., 0.5 seconds or 3 seconds) and the length of time represented by the histogram can be increased or decreased (e.g., 60 seconds before and after the deadzone). Further, the visualization of the heatmap 300 can be modified to show a histogram for a single event type or any number of event types (e.g., 30 event types).

In some embodiments, a network manager can configure a session analytics tool to generate the heatmap 300 periodically and specify any selected combination of event types to include in a particular heatmap 300. In an embodiment, a server device is configured to analyze the event data periodically and generate one or more heatmaps 300 corresponding to different subsets of event types. The heatmaps 300 are then used to automatically or manually adjust the operation of the network. For example, in one embodiment, the heatmap(s) 300 can be generated and a visualization of the heatmap(s) 300 is automatically emailed to a network manager periodically for review. As another example, the heatmap(s) 300 are generated and then an operation for reconfiguring the service or network (e.g., migrating VMs, provisioning new hosts, etc.) is performed based on the distribution in the heatmaps(s) 300.

As depicted in FIG. 3, the visualization of the heatmap 300 can indicate quickly whether a particular event type is potentially a root cause of the deadzone. For example, the Attach App Image event type shows that these events are potentially a root cause of the deadzone and occur sometime prior to the deadzone, but the timing of these events relative to the deadzone varies quite a bit. In contrast, the Event Streamer event is correlated highly with a deadzone very close in time to the time of the event. In contrast, the Finished Max event type appears to show a more uniform distribution of events relative to a corresponding deadzone, which indicates that the Finished Max event is not likely to be a root cause of the corresponding deadzone.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

It should be understood that the systems and arrangements of components described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations set forth herein is within the scope and spirit of embodiments of the present disclosure.

Parallel Processing Architecture

Figure 4:
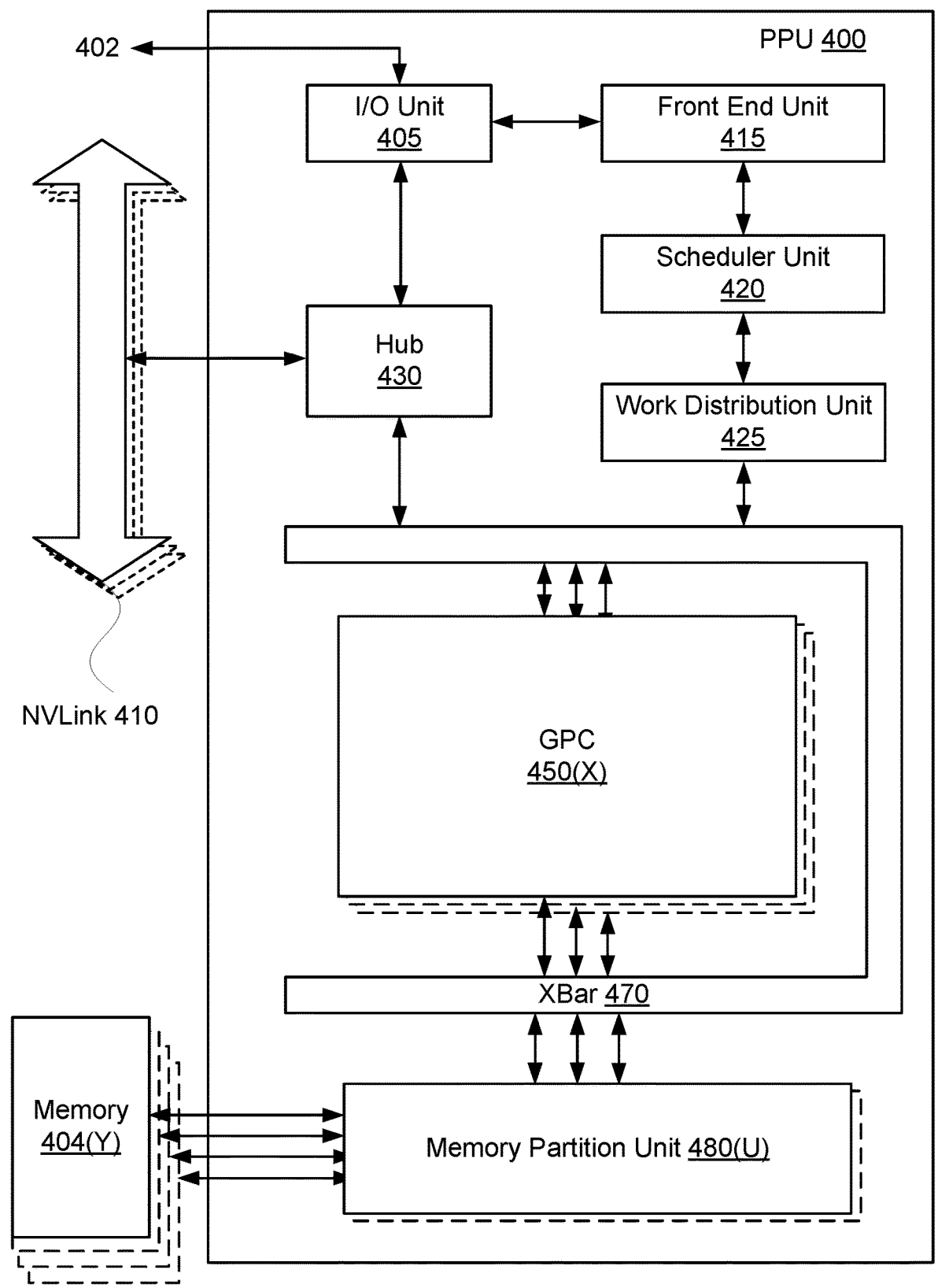
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement, at least in part, one or more stages of the pipelined stack 100. For example, the PPU 400 may be used to implement one or more of the encode stage 120, the decode stage 160, a rendering engine of a game application server executed by a host device, the analytics engine 290, or the like.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths.

In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
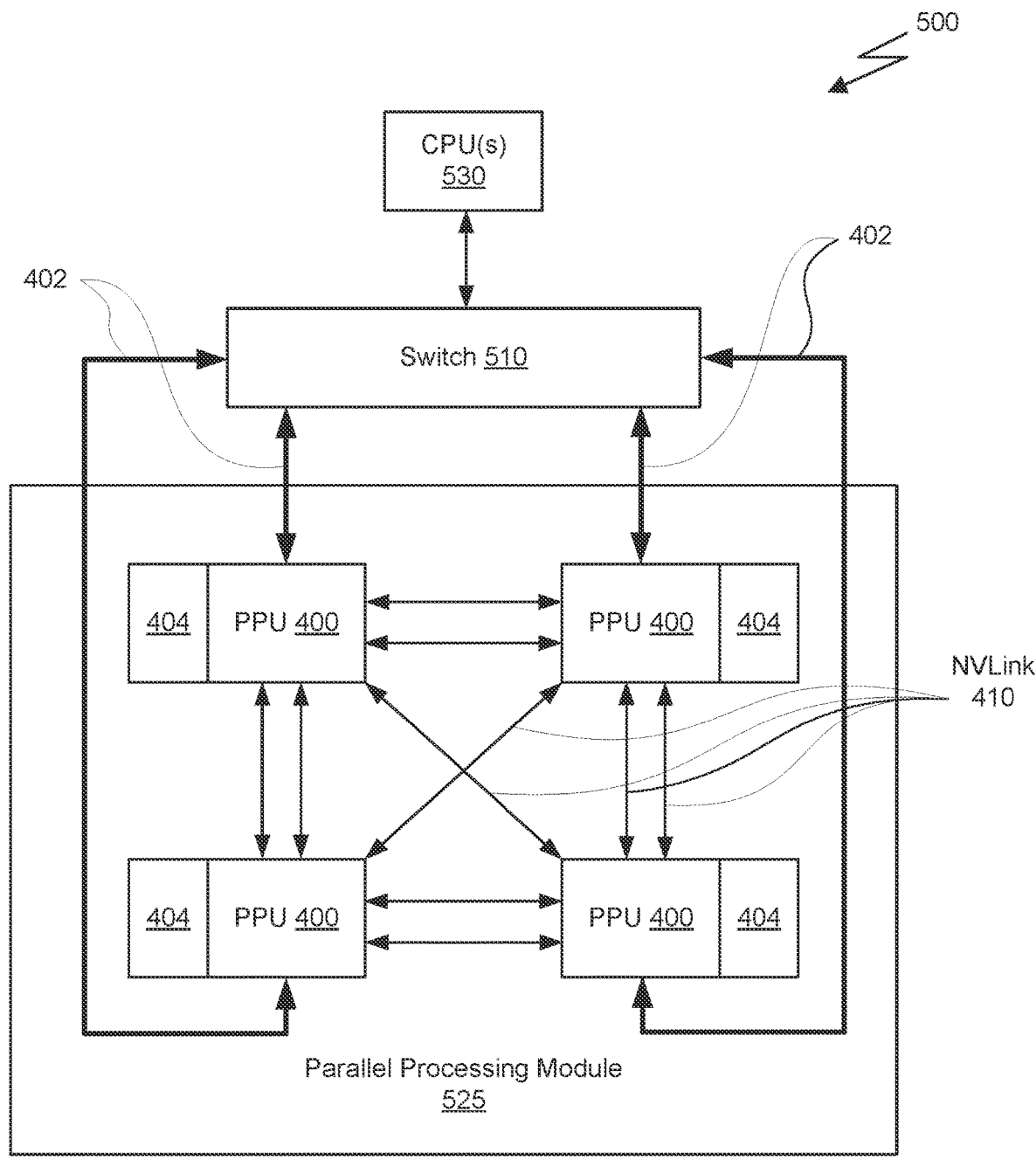
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 565 may be configured to implement the method 200 shown in FIG. 2. The processing system 500 includes a CPU 530, switch 510, and multiple PPUs 400, and respective memories 404.

Figure 5B:
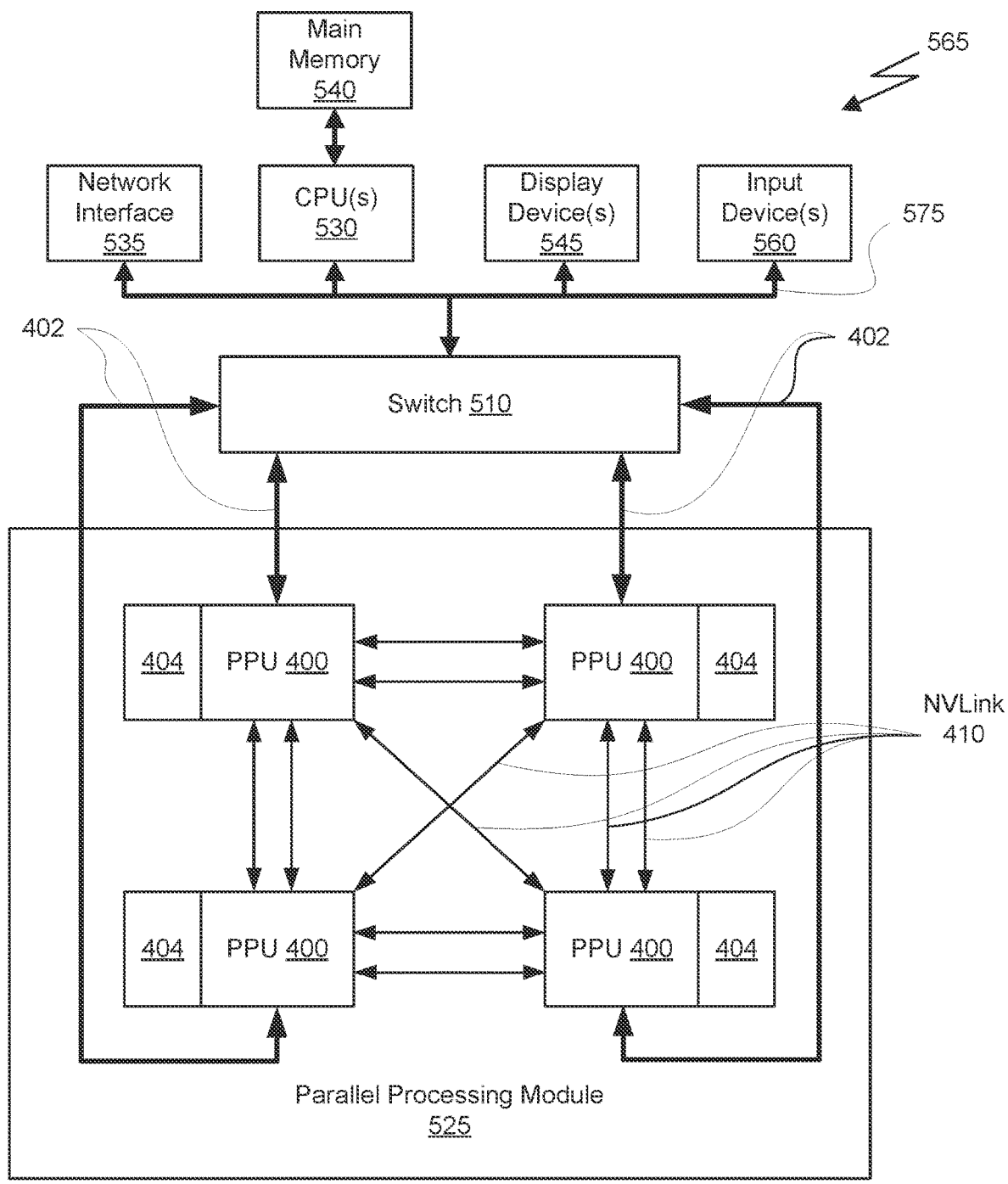
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method 200 shown in FIG. 2.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Figure 5C:
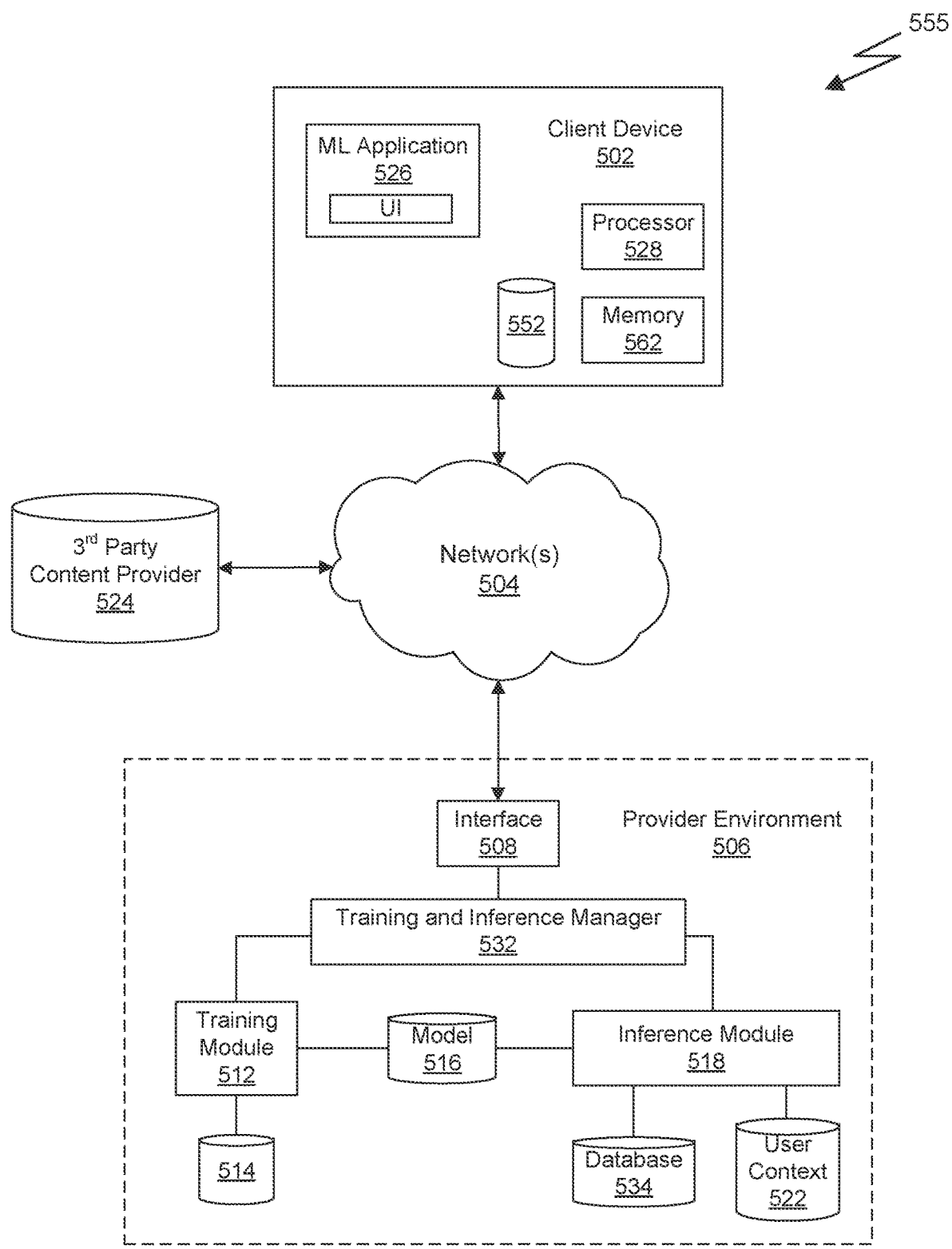
FIG. 5C illustrates components of an exemplary system that can be used to train and utilize machine learning, in at least one embodiment.

Although the various blocks of FIG. 5C are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5C is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5C.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5B and/or exemplary system 565 of FIG. 5C. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 300 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In an embodiment, the set of training data 514 may be used in a generative adversarial training configuration to train a generator neural network.

In at least one embodiment, training data can include images of at least one human subject, avatar, or character for which a neural network is to be trained. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6A:
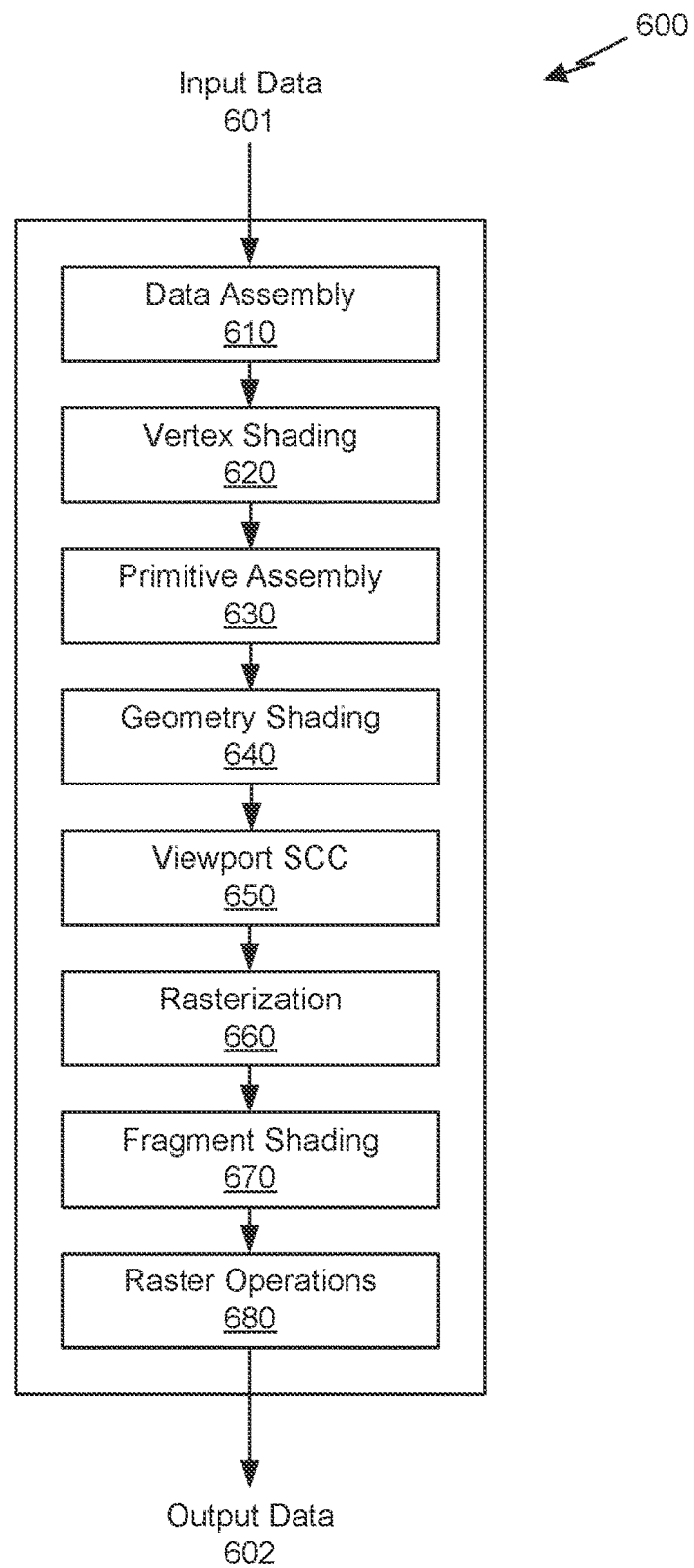
FIG. 6A is a conceptual diagram of a graphics processing pipeline implemented by the PPU of FIG. 4 suitable for use in implementing some embodiments of the present disclosure.

FIG. 6A is a conceptual diagram of a graphics processing pipeline 600 implemented by the PPU 400 of FIG. 4, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6A, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 400. Other stages of the graphics processing pipeline 600 may be implemented by programmable hardware units such as the processing unit within the PPU 400.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline 600 utilizing the hardware of the PPU 400.

Various programs may be executed within the PPU 400 in order to implement the various stages of the graphics processing pipeline 600. For example, the device driver may launch a kernel on the PPU 400 to perform the vertex shading stage 620 on one processing unit (or multiple processing units). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on a processing unit.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Game Streaming System

Figure 6B:
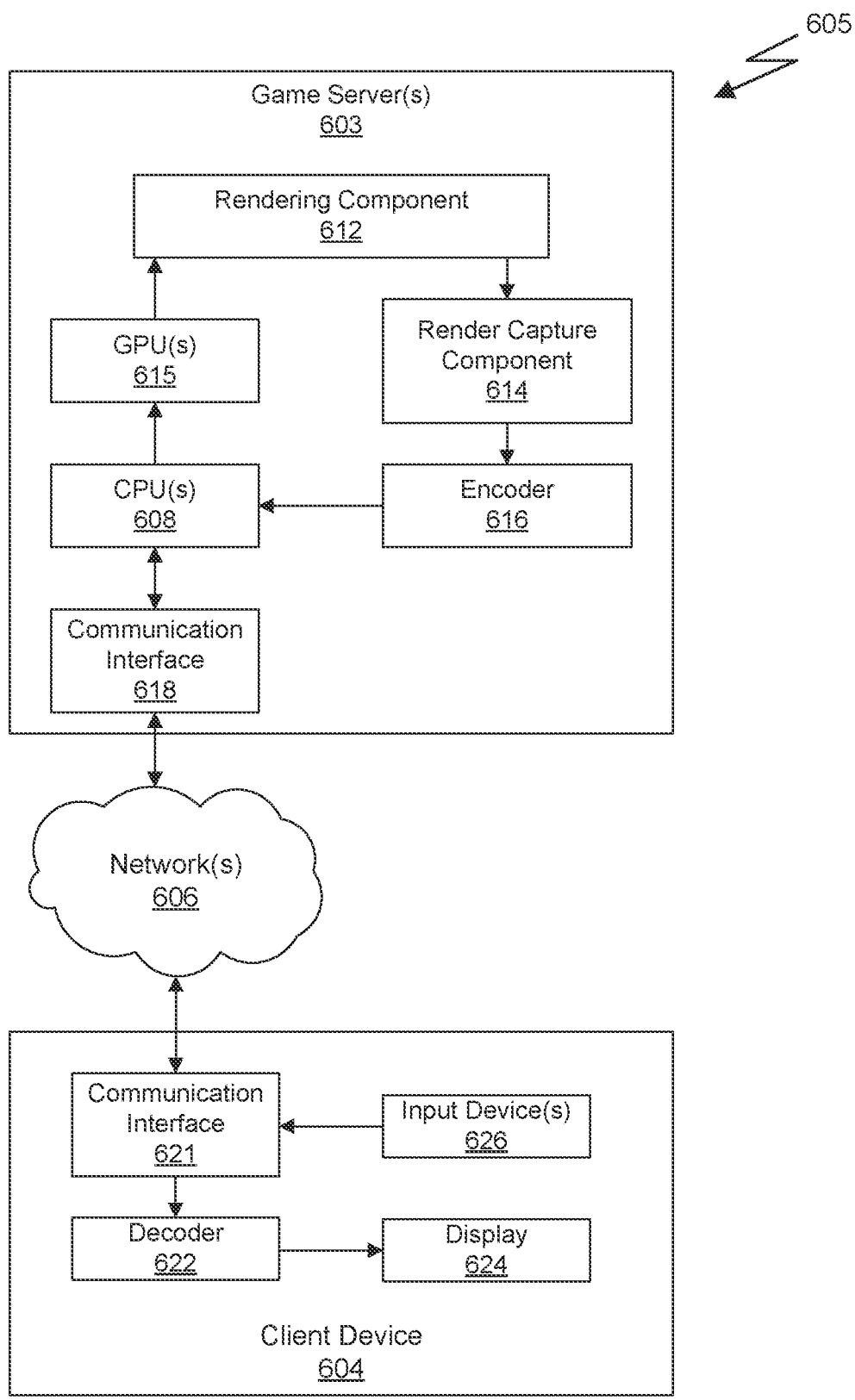
FIG. 6B illustrates an exemplary game streaming system suitable for use in implementing some embodiments of the present disclosure.

FIG. 6B is an example system diagram for a game streaming system 605, in accordance with some embodiments of the present disclosure. FIG. 6B includes game server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In the system 605, for a game session, the client device(s) 604 may only receive input data in response to inputs to the input device(s), transmit the input data to the game server(s) 603, receive encoded display data from the game server(s) 603, and display the display data on the display 624. As such, the more computationally intense computing and processing is offloaded to the game server(s) 603 (e.g., rendering—in particular ray or path tracing—for graphical output of the game session is executed by the GPU(s) of the game server(s) 603). In other words, the game session is streamed to the client device(s) 604 from the game server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the game server(s) 603. The client device 604 may receive an input to one of the input device(s) and generate input data in response. The client device 604 may transmit the input data to the game server(s) 603 via the communication interface 621 and over the network(s) 606 (e.g., the Internet), and the game server(s) 603 may receive the input data via the communication interface 618. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the game server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on"

and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
   identifying one or more deadzones associated with at least one streaming session in a plurality of streaming sessions, wherein the at least one streaming session corresponds to at least a portion of a software stack executed on a virtual machine of a host computing device;
   for each deadzone identified for a particular streaming session, identifying events in event data generated by one or more additional virtual machines of the host computing device that occur proximate the deadzone;
   for each event type of a plurality of event types, determining a distribution of events of the event type relative to the identified deadzones; and
   adjusting an operation of the host computing device based on the distribution of events for the plurality of event types.

2. The computer-implemented method of claim 1, wherein the software stack comprises a plurality of stages of a game streaming service that includes at least one of a frame capture stage, an encoding stage, and a transmit stage.

3. The computer-implemented method of claim 2, wherein the host computing device executes a second virtual machine configured to execute a game application, wherein the game application is configured to generate image frames that are processed by the software stack to send a bitstream to a client device that is configured to display the image frames to a user of the game streaming service, and wherein the client device is configured to transmit inputs from the client device to the game application to render subsequent frames of the game application.

4. The computer-implemented method of claim 1, wherein identifying events in the event data generated by one or more additional virtual machines of the host computing device that occur proximate the deadzone comprises:
   for each event in the event data, calculating a difference between a timestamp associated with the event and a timestamp associated with each identified deadzone; and
   flagging, for a particular deadzone, each event having an absolute value of the difference that is less than a threshold value as being correlated with the deadzone.

5. The computer-implemented method of claim 1, wherein determining the distribution of events of the event type relative to the time of the corresponding deadzone comprises:
   generating a histogram by counting a number of occurrences of each event type within a number of time segments in a time window surrounding the corresponding deadzone.

6. The computer-implemented method of claim 5, wherein adjusting the operation of the host computing device based on the distribution of events for the plurality of event types comprises:
   determining that the distribution of events for a particular event type includes a number of events in a particular time segment that exceeds an average number of events per time segment by a threshold amount; and
   identifying the operation based on the particular event type.

7. The computer-implemented method of claim 1, wherein adjusting the operation of the host computing device comprises migrating a second virtual machine on the host computing device to a second host computing device.

8. The computer-implemented method of claim 1, wherein adjusting the operation of the host computing device comprises migrating data corresponding to the event type from a first storage device to a second storage device.

9. The computer-implemented method of claim 1, wherein identifying one or more deadzones associated with at least one streaming session in the plurality of streaming sessions comprises:
   sorting one or more timestamps included in metadata for the at least one streaming session into a series;
   computing a difference between each timestamp in the series with a previous timestamp; and
   comparing each difference to a threshold value, wherein any difference greater than the threshold value indicates an identified deadzone.

10. A system comprising:
    at least one host computing device, each host computing device configured to launch at least one virtual machine configured to process content for one or more streaming sessions, wherein each streaming session corresponds to a software stack executed on a virtual machine of a host computing device that is configured to generate content for display by a corresponding client device; and
    an analytics engine configured to:
    identify deadzones associated with at least one streaming session in a plurality of streaming sessions;
    for each deadzone identified for a particular streaming session of a particular host computing device, identify events in event data generated by one or more additional virtual machines of the particular host computing device that occur proximate the deadzone;
    for each event type of a plurality of event types, determining a distribution of events of the event type relative to the identified deadzones; and
    adjusting an operation of the at least one host computing device based on the distribution of events for the plurality of event types.

11. The system of claim 10, wherein the software stack comprises a plurality of stages of a game streaming service that includes at least one of a frame capture stage, an encoding stage, and a transmit stage.

12. The system of claim 11, wherein the host computing device executes a second virtual machine configured to execute a game application, wherein the game application is configured to generate image frames that are processed by the software stack to send a bitstream to a client device that is configured to display the image frames to a user of the game streaming service, and wherein the client device is configured to transmit inputs from the client device to the game application to render subsequent frames of the game application.

13. The system of claim 10, wherein identifying events in the event data generated by one or more additional virtual machines of the host computing device that occur proximate the deadzone comprises:
   for each event in the event data, calculating a difference between a timestamp associated with the event and a timestamp associated with each identified deadzone; and flagging, for a particular deadzone, each event having an absolute value of the difference that is less than a threshold value as being correlated with the deadzone.

14. The system of claim 10, wherein determining the distribution of events of the event type relative to the time of the corresponding deadzone comprises:
generating a histogram by counting a number of occurrences of each event type within a number of time segments in a time window surrounding the corresponding deadzone.

15. The system of claim 14, wherein adjusting the operation of the host computing device based on the distribution of events for the plurality of event types comprises:
determining that the distribution of events for a particular event type includes a number of events in a particular time segment that exceeds an average number of events per time segment by a threshold amount; and
identifying the operation based on the particular event type.

16. The system of claim 10, wherein adjusting the operation of the host computing device comprises migrating a second virtual machine on the host computing device to a second host computing device.

17. The system of claim 10, wherein adjusting the operation of the host computing device comprises migrating data corresponding to the event type from a first storage device to a second storage device.

18. The system of claim 10, wherein identifying one or more deadzones associated with at least one streaming session in the plurality of streaming sessions comprises:
sorting one or more timestamps included in metadata for the at least one streaming session into a series;
computing a difference between each timestamp in the series with a previous timestamp; and
comparing each difference to a threshold value, wherein any difference greater than the threshold value indicates an identified deadzone.

19. A non-transitory computer-readable medium storing instructions that, when executed by a processor, cause the processor to perform steps comprising:
for at least one streaming session in a plurality of streaming sessions, identifying one or more deadzones associated with the at least one streaming session, wherein each streaming session corresponds to a software stack executed on a virtual machine of a host computing device;
for each deadzone identified for a particular streaming session, identifying events in event data generated by one or more additional virtual machines of the host computing device that occur proximate the deadzone;
for each event type of a plurality of event types, determining a distribution of events of the event type relative to the identified deadzones; and
adjusting an operation of the host computing device based on the distribution of events for the plurality of event types.

20. The non-transitory computer-readable medium of claim 19, wherein the software stack comprises a plurality of stages of a game streaming service that includes at least one of a frame capture stage, an encoding stage, and a transmit stage.

* * * * *